United States Patent [19]
Fantasia et al.

[11] 3,899,213
[45] Aug. 12, 1975

[54] AIRBORNE LASER REMOTE SENSING SYSTEM FOR THE DETECTION AND IDENTIFICATION OF OIL SPILLS

[75] Inventors: John F. Fantasia, Newton; Hector C. Ingrao, Wellesley, both of Mass.

[73] Assignee: The United States of America as represented by the Secretary of the Department of Transportation, Washington, D.C.

[22] Filed: Mar. 8, 1974

[21] Appl. No.: 449,327

[52] U.S. Cl. ................................ 250/301; 250/461
[51] Int. Cl.² .................. G01T 1/169; G01N 21/38
[58] Field of Search .......... 250/301, 302, 339, 341, 250/365, 461

[56] References Cited
UNITED STATES PATENTS 3,603,952  9/1971  Smith ............................ 250/341 X
3,783,284  1/1974  McCormack ...................... 250/301

*Primary Examiner*—Archie R. Borchelt
*Attorney, Agent, or Firm*—Herbert E. Farmer; Harold P. Deeley, Jr.

[57] ABSTRACT

A technique for the identification, from a remote location, of oil comprising a marine oil spill. The technique includes directing pulses of high energy artificial light onto the spill to cause the oil to fluoresce and the incremental scanning of the frequency spectrum of the thus generated fluorescence energy; there being a distinct fluorescent spectral signature for each type of oil. The invention also includes the rejection of background radiation and the real time presentation of the fluorescence spectrum of the oil comprising a spill.

8 Claims, 4 Drawing Figures

PATENTED AUG 1 2 1975　　　3,899,213

SHEET 1

AIRBORNE LASER REMOTE SENSING SYSTEM FOR THE DETECTION AND IDENTIFICATION OF OIL SPILLS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to oil spill sensing systems and techniques. More specifically, this invention is directed to methods of and apparatus for the identification and classification, from a remote location, of oil spills in the marine environment. Accordingly, the general objects of the present invention are to provide novel and improved methods and apparatus of such character.

2. Description of the Prior Art

There are many known techniques for the remote sensing of oil spills in the marine environment. There prior art sensing techniques operate in different portions of the electromagnetic spectrum ranging from the ultraviolet to the microwave region. The prior art sensing techniques have been implemented by systems that are either passive or active such as, for example, microwave radiometers, radar mappers, aerial photographic cameras, infrared thermographs and low light level television systems. These previous systems are capable of detecting oil spills only under a particular set of variable conditions suited to each individual technique; the conditions in question including sea state, weather, visibility and lighting conditions. In addition to being constrained to a particular set of ambient conditions for proper operation, none of the prior art systems has the capability of providing output information which permits the type of oil comprising the spill to be adequately identified or classified. Examples of prior art oil detection techniques which are lacking in the capability of providing information which permits a qualitative analysis may be found in U.S. Pat. Nos. 3,581,085 and 3,731,091.

It is known that certain materials, including oil, can be detected by sensing fluorescent radiation emitted by these materials as a result of their exposure to a source of exciting radiation. Thus, by way of example, U.S. Pat. No. 3,598,994 reveals a technique for sensing fluorescent substances using sunlight as a source of exciting radiation. Since an oil spill surveillance system should be capable of both day and night operation, and since the fluorescent power conversion coefficient of oil is low, passive systems using natural energy sources such as sunlight are not feasible.

Studies have previously been conducted to determine the feasibility of using laser-excited fluorescence as a means of detecting, identifying and quantifying oil spills in the marine environment. The results of these studies was reported in a paper entitled "The Remote Sensing Of Oil Spills By Laser Excited Fluorescence" by John F. Fantasia, Thomas M. Hard and Hector C. Ingrao presented at the 1972 proceedings of the Institute of Environmental Sciences. As reported in the referenced paper, the fluorescence emission spectra, intensities and emission lifetimes of various oils differ. Since different oil types have distinct fluorescent spectral "signatures," airborne identification of the oil type comprising a spill appeared to be feasible. However, as is often the case, proceeding from a laboratory feasibility study to actual implementation presented numerous problems. Thus, by way of example, in a closed container any one oil forms a single solution with a uniform specific gravity, viscosity and optical properties. However, when the same oil spreads on the sea surface, fractionation can occur because different molecules have different mobilities through the oil into the atmosphere and into the water. These processes produce a lateral gradient of mechanical and optical properties within an oil slick and a change in the overall properties of the oil comprising the slick due to loss of lighter fractions. Thus, when a spill is detected, it is necessary that its fluorescent spectrum be produced in real time. In addition, since the fluorescent power conversion coefficient of oil is low, apparatus usable in the field as opposed to the laboratory must include the capability of rejection of background light in the frequency range of the stimulated fluorescence. Further, to insure rapid and accurate analysis, the fluorescent emission spectra must be rapidly analyzed.

SUMMARY OF THE INVENTION

The present invention overcomes the deficiencies of the prior art and in so doing provides a novel and improved technique for the identification and classification of oil when accidently or deliberately spilled in the marine environment. In accordance with the present invention oil is caused to fluoresce by directing, to the surface of a spill, high energy pulses of ultraviolet light. A portion of the ultraviolet absorption of the target oil is reemitted at longer wave lenghts. This reemission or fluorescence is "collected" and focused at the entrance slit of a spectrometer. The fluorescence radiation delivered to the spectrometer is dispersed into a spectrum characteristic of the oil type. This spectrum is incrementally scanned in a preselected sequence. During scanning, for each incremental portion of the fluorescence spectrum, background "noise" is subtracted from the collected stimulated fluorescence. The results of the scanning of the entire spectrum may be displayed in real time and may also be delivered to suitable computation apparatus wherein a comparison with prerecorded temporal "signatures" of various oil samples is performed.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 4 is a flow diagram indicating the various steps performed in accordance with the present invention.

DESCRIPTION OF THE PREFERRED EMBODIMENT

Figure 1:
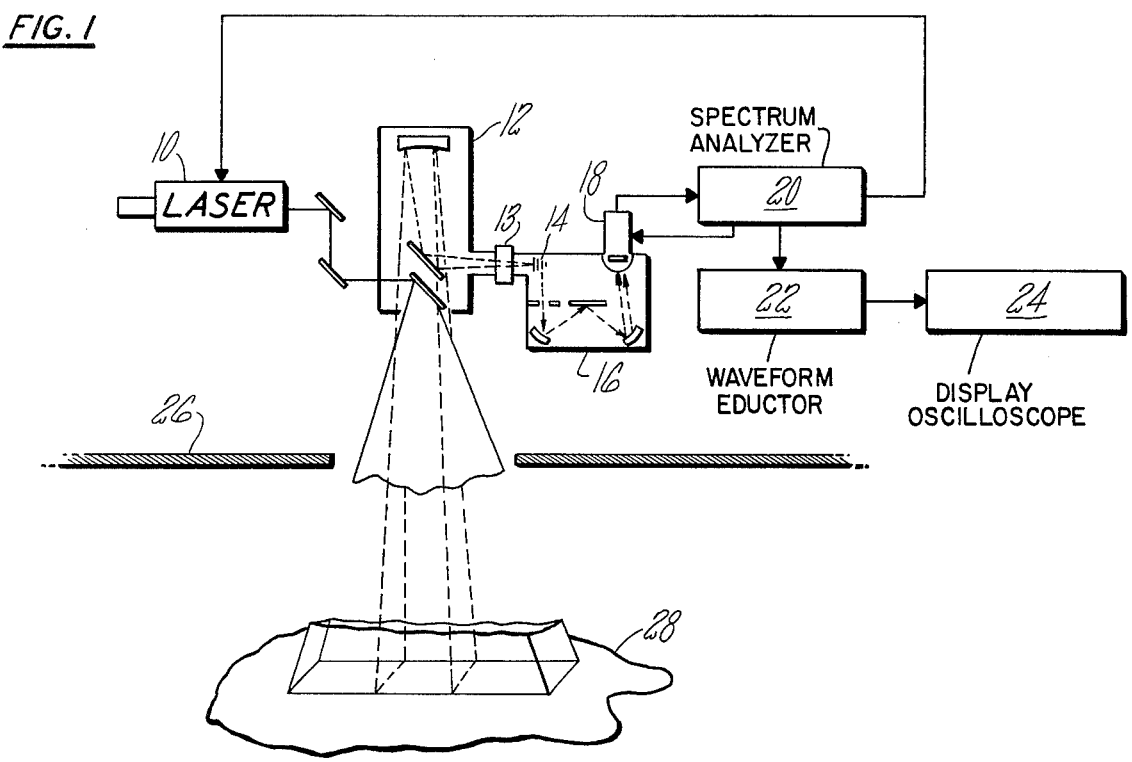
FIG. 1 is a block diagram of apparatus for use in oil spill classification in accordance with the present invention.

With reference to FIG. 1, an embodiment of apparatus which may be employed in the practice of the present invention is depicted in block diagram form. The apparatus of FIG. 1 includes a laser transmitter 10, a receiver-telescope 12, an ultraviolet blocking filter 13, an image slicer 14, a spectrometer 16, an image dissector 18, a spectrum analyzer 20, a waveform eductor 22 and a display device 24. All of the above cataloged apparatus is mounted in an aircraft, the air frame being indicated schematically at 26, and is employed in the identification and classification of oil spills; a spill being indicated at 28. While the apparatus of FIG. 1 may be employed in both oil spill detection and classification modes, the present invention is concerned only with classification.

Once the system is airborne and an oil spill detected, the apparatus will be energized in the classification operational mode and the laser 10 caused to emit pulses of ultraviolet energy which are directed down onto an area of the sea surface directly below the aircraft. The incident laser pulses will cause the oil comprising spill 28 to fluoresce in the visible region of the electromagnetic spectrum. A portion of this fluorescence energy is collected by the telescope 12 and focused onto the entrance slit of spectrometer 16 by image slicer 14. The fluorescence radiation entering the spectrometer entrance slit is dispersed by a plane grating into a spectrum characteristic of the oil type. That is, the spectrometer separates the fluorescence energy reemitted by the spilled oil, as the result of simulation by the high energy artifical light source comprising laser 10, with respect to its frequency; i.e., its color. This oil fluorescence spectrum, which is of course arranged linearly, is imaged onto the photocathode of image dissector 18.

The image dissector 18 converts the output of the spectrometer 16 into a usable form for analysis. Photoelectrons emitted by the photocathode of dissector 18 produce a deflectable electron image of the oil fluorescence spectrum. A portion of the electron image is dissected by a slit aperture in dissector 18 and amplified in a photomultiplier section. Restated, the spectrometer optical output is divided into segments which are incrementally scanned in a preselected sequence by the image dissector.

Electrical output signals commensurate with each incremental step in the scanning of the spectrometer optical output are applied to the spectrum analyzer 20. The spectrum analyzer 20, as will be explained in greater detail below in the discussion of FIG. 2, controls the firing of laser 10 and the scanning of the spectrometer output by image dissector 18. Analyzer 20 also subtracts the background radiation received by the spectrometer from the signals received as a result of stimulation of the oil spill 28. Thus, the spectrum analyzer 20 processes the signal resulting from the scan of the fluorescent spectral "signature" of the target oil spill and controls the operation of the high energy light source which causes the oil to fluoresce. The output of the analyzer 20, a signal commensurate with the spectral content of the returned fluorescence in usable form for display and/or computer analysis, is averaged in the waveform eductor 22 and thereafter applied to a display device and/or computer 24.

Apparatus in accordance with a preferred embodiment of the FIG. 1 system will comprise a $N_2$ pulsed gas laser system. An Avco "Invisiline" Model C5000 having an output at 337.1 nm has been successfully employed. This laser is capable of a pulse repetition rate continuously adjustable from 5 to 500 pulses per second, a peak output power of 100 kilowatts and an effective pulse width of 10 ns. The receiver 12, in a preferred embodiment, was a Newtonian type telescope having a field-of-view which is coaxial with the laser beam. An image slicer 14 was used at the entrance slit of the spectrometer to improve the light collection efficiency of the receiver system. The image slicer causes most of the received light to pass the spectrometer entrance slit by means of slicing up the image of the irradiated portion of the oil spill into a series of strips of equal width to that of the entrance slit and arranging these strips end-to-end along the slit. The image slicer consists of three front surface mirrors aligned and attached to a kinematic mount to form an assembled unit which is registered to the entrance slit of the spectrometer.

In the embodiment being described the spectrometer was of the Ebert-Fastie type having a wave length of operation from 350 to 700 nanometers. The spectrometer, using a high efficiency replica grating with 295 grooves per millimeter, which was blazed at 450 nanometers, gave a reciprocal linear dispersion of 17.5 nanometers per millimeter. With this dispersion the 350 nm spectrometer range subtends 20 mm at its output. The resolution of the spectrometer was 10 nm at 450 nm width a 0.57 mm width entrance slit. The aperture ratio of the spectrometer was matched to that of the receiving telescope 12.

As previously noted, the output of spectrometer 16 is imaged on the photocathode of an image dissector tube 18. The image dissector may comprise an ITT "Vidissector" type F4011 RP. This dissector tube has an S-20 photocathode with ten stages of secondary electron multiplication and employs magnetic focusing and deflection. In one reduction to practice of the FIG. 1 system the image dissector tube had an aperture slit of 6.3 mm × 0.57 mm resulting in a spectral resolution of 10 nm. Operating under the control of the analyzer 20, the image dissector may be caused to scan, in a preselected sequence, thirty-five 10 nm segments of the spectrometer optical output signal.

Figure 2:
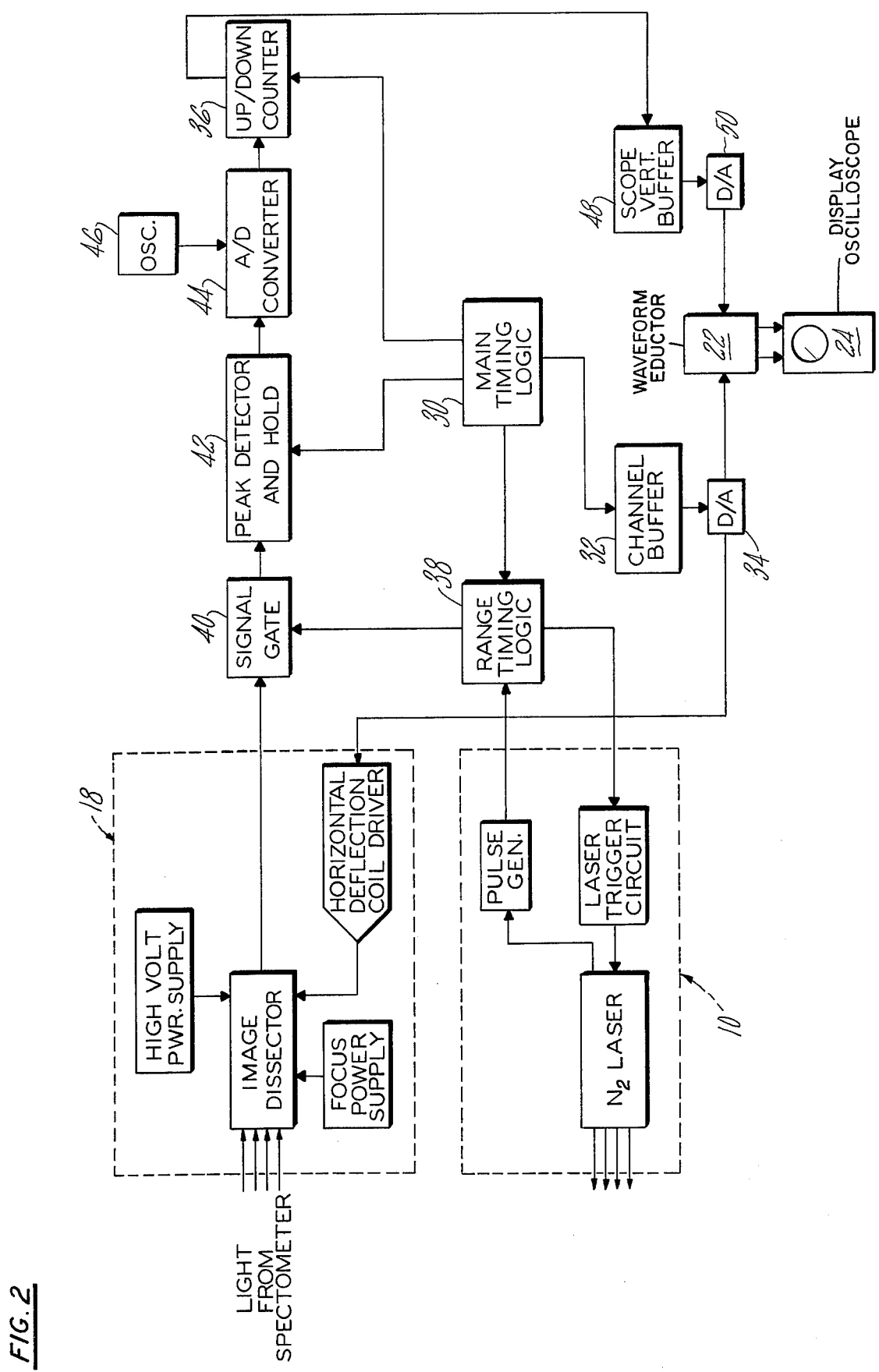
FIG. 2 is a functional block diagram of means for electronically controlling the apparatus of FIG. 1.

The structure and operation of a spectrum analyzer 20 in accordance with a preferred embodiment of the invention may be seen by joint consideration of FIGS. 2 and 4. As noted above, analyzer 20 controls the scanning of the image dissector 18 and the firing of the laser 10. The main controlling portion of the analyzer 20 consists of timing logic circuitry 30. Circuit 30, as will be described in greater detail below, generates all control signals necessary for providing synchronization pulses to the laser and scanning control signals to the image dissector. In the disclosed embodiment signals received from the image dissector 18 are converted into digital form for ease in handling. All the manipulations of the image dissector output signal, background noise subtraction for example, are done in digital form. After the processing of the signals commensurate with each incremental scan of the fluorescence spectrum is complete, the digital signal is reconverted into analog form for delivery to display 24. The digital signals may also be delivered to a data processor for storage and comparison with prerecorded sample spectral information.

When an identification cycle is initiated, the timing logic circuit 30 will produce a first output pulse which is employed to interrogate a channel buffer 32. The contents of channel buffer 32, which will consist of digital information commensurate with the increment of the spectrometer output to be scanned by the image dissector 18, is converted into analog form by a digital-to-analog converter 34. The analog output signal from converter 34 is used to drive the magnetic deflection coil of image dissector 18 such that the appropriate increment of the spectral signature of the oil spill is viewed. After an appropriate delay, which allows the magnetic deflection to settle to the proper position, an up-down counter 36 will be cleared by a timing signal provided by logic circuit 30. The up-down counter 36 is also set to count "up." The first signal to be received by analyzer 20 will be commensurate with the background plus any fluorescence generated by the laser output pulse.

Subsequent to the setting of image dissector 18 and counter 36, the laser 10 will be commanded to fire by a further timing pulse provided by logic circuit 30. The control pulse which commands firing of the laser is delivered from logic circuit 30 to a trigger circuit, which comprises part of laser 10, by a range timing logic circuit 38. Logic circuit 38 comprises gate circuits and an adjustable delay circuit. Under the control of circuit 38, the analyzer waits for the actual firing of the laser as indicated by a signal provided by a pulse generator which comprises part of laser 10. Upon receipt of a signal from the laser pulse generator the range timing logic circuit 38 initiates a delay which corresponds to the time required for the laser energy to reach the target plus the time for the fluorescence energy to return through the optical receiver. When this time has elapsed the range timing logic circuit 38 will provide a signal which opens a sample gate 40 for 500 nanoseconds. During the time gate 40 is open an analog signal from image detector 18 will be passed to a peak detector and hold circuit 42. The signal thus provided to detector 42 will be commensurate with the background noise plus any fluorescence resulting from the direction of the laser output pulse on the oil spill. Detector circuit 42 may comprise a conventional Boxcar circuit.

The signal temporarily stored in detector circuit 42 will be applied to the input of an analog-to-digital converter 44; converter 44 receiving a second input from a pulse source 46. The digital output signal from converter 44 is applied to and stored in the "up" direction in up-down counter 36.

After a suitable delay for the above mentioned signal processing, the timing logic circuit 30 will provide a clearing pulse which is delivered to detector 42. Simultaneously, a control pulse is delivered to counter 36 to set this up-down counter to count in the "down" direction.

Without changing the position of the photocathode image of dissector 18 with respect to the aperture, another 500 nsec sample is taken, under the control of timing logic circuit 30 and range logic circuit 38, without triggering laser 10. This second sample will contain only the background or noise. A signal commensurate with the second sample will be processed in the same manner as the first sample; i.e., the background signal will be passed by gate 40 to detector 42 and converted into a digital signal by converter 44. The digital signal commensurate with the background is applied to counter 36 which will count this new data "down" thereby performing a simple subtraction. As a result of this subtraction the up-down counter 36 will contain just the digital equivalent of the amplitude of any fluorescents generated by the laser.

The detector circuit 42 is again cleared and, under the control of timing logic circuit 30, the contents of up-down counter 36 are loaded into a scope vertical buffer 48. At this time the data commensurate with the scanned increment of the spectrometer output is ready for external use. The scope vertical buffer 48 and the channel buffer 32 are connected to respective digital-to-analog converters 50 and 34 which track the contents of their associated buffers. The analog signals from digital-to-analog converters 34 and 50 are, in the disclosed embodiment, applied to eductor 22. Eductor 22 may be a Princeton Applied Research Corporation Model TDH-9/99. The waveform eductor comprises essentially a series of capacitors which enhance the output signals of analyzer 20 by integrating such signals over a period of time and averaging out any remaining noise. If the output signals from analyzer 20 were applied directly to a display device such as an oscilloscope a plurality of spaced dots would appear. Waveform eductor 22 permits the playback of the incremental spectrum analysis, which in a preferred embodiment consisted of viewing thirty-five segments of the spectrometer optical output in seventy milliseconds, at a sufficiently slow speed so as to provide output signals such as those depicted in FIG. 3. The output signals from eductor 22 are applied to display device 24, which may comprise an oscilloscope, so as to produce the fluorescence spectrum of the target oil in real time. It is also to be noted that the digital signals, as appear at the outputs of buffers 32 and 48 of analyzer 20, may be applied to a data processor wherein these signals will be compared with previously recorded samples commensurate with various oil types. As a result of the computer comparison the oil type comprising the spill may be positively identified. Such identification may also, of course, be made by an experienced operator viewing the oscilloscope 24.

Figure 3:
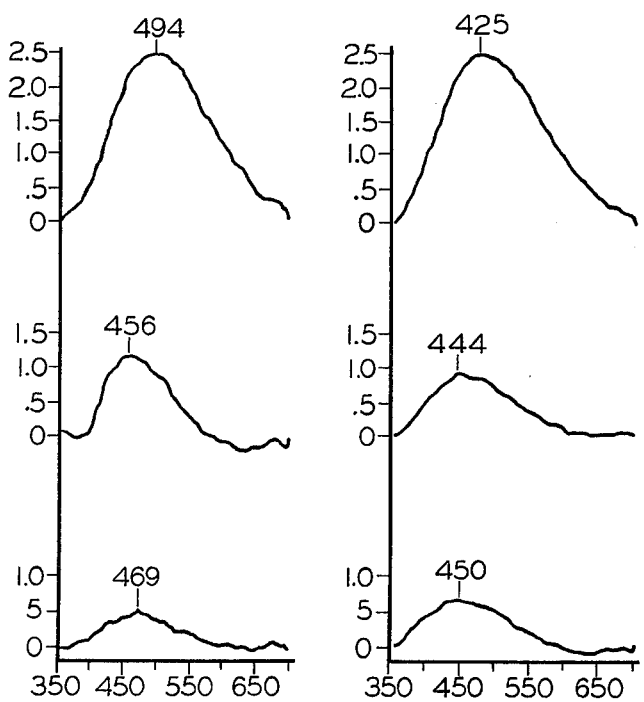
FIG. 3 is a graphical representation of the results of the incremental analysis of the fluorescent spectrums of various samples.

FIG. 3 depicts the fluorescence spectra of sea water and two types of oil. The curves in FIG. 3 are oscillograms which have been arranged in a manner which facilitates visual comparison. The curves on the left, from top to bottom, are spectra respectively of Nigerian Medium Crude, No. 2 Diesel fuel and sea water measured during daylight hours. The curves on the right are spectra of the same samples measured after sundown employing the same apparatus. The curves plot relative signal strength versus wave length in nanometers.

It is believed it will now be obvious to those skilled in the art that the present invention provides a novel and exceedingly useful manner of identifying the type of oil comprising a spill. Such identification is exceedingly important in order to insure that the proper apparatus for containing and cleaning the spill is delivered to the scene and also as evidence in procedures instituted against the party responsible for an illegal and unreported discharge of petroleum upon the surface of the ocean.

While a preferred embodiment has been shown and described, various modifications and substitutions may be made thereto without departing from the spirit and

What is claimed is:

1. A method for the classification of materials from a remote location comprising the steps of:
   directing high energy pulses of artificial light onto the material to be classified to cause the material to fluoresce;
   separating the resulting fluorescent energy into its electromagnetic frequency spectrum;
   incrementally scanning at least a portion of the fluorescence spectrum to provide signals commensurate with the magnitude of the energy comprising frequency bands of preselected width; and
   combining the results of the incremental scanning of the fluorescence spectrum to provide an output waveform commensurate with the distinct spectral signature of the material.

2. The method of claim 1 wherein each step of incremental scanning comprises:
   observing a band of the electromagnetic spectrum subsequent to stimulation of the material with a light pulse whereby the fluorescence and background radiation is viewed;
   observing the same band of the electromagnetic spectrum with the material in the unstimulated state whereby only the background radiation is viewed; and
   subtracting the background radiation from the fluorescence plus background to provide an output signal commensurate only with the magnitude of the fluorescence in the frequency band being viewed.

3. The method of claim 2 wherein the step of separating comprises:
   collecting the light energy returned from the material; and
   delivering the thus collected light energy to a spectrometer.

4. The method of claim 3 wherein the step of directing high energy pulses of light comprises:
   periodically energizing a source of monochromatic light; and
   routing the light pulses provided by said source onto the material in a direction coaxial with the direction in which the material is viewed to collect background and reemitted fluorescence radiation.

5. The method of claim 4 wherein the step of separating further comprises:
   enhancing the strength of the collected light delivered to the spectrometer by dividing the image of the material into a series of strips and focusing such strips at the entrance slit of the spectrometer.

6. The method of claim 1 wherein the step of separating comprises:
   collecting the light energy returned from the material; and
   delivering the thus collected light energy to a spectrometer.

7. The method of claim 6 wherein the step of directing high energy pulses of light comprises:
   periodically energizing a source of monochromatic light; and
   routing the light pulses provided by said source onto the material in a direction coaxial with the direction in which the material is viewed to collect background and reemitted fluorescence radiation.

8. The method of claim 7 wherein each step of incremental scanning comprises:
   observing a band of the electromagnetic spectrum subsequent to stimulation of the material with a light pulse whereby the fluorescence and background radiation is viewed;
   observing the same band of the electromagnetic spectrum with the material in the unstimulated state whereby only the background radiation is viewed; and
   subtracting the background radiation from the fluorescence plus background to provide an output signal commensurate only with the magnitude of the fluorescence in the frequency band being viewed.

* * * * *